United States Patent [19]

Weems

[11] Patent Number: 4,955,645
[45] Date of Patent: Sep. 11, 1990

[54] GAUGING DEVICE AND METHOD FOR COUPLING THREADED, TUBULAR ARTICLES AND A COUPLING ASSEMBLY

[75] Inventor: Craig C. Weems, Houston, Tex.

[73] Assignee: Tuboscope, Inc., Houston, Tex.

[21] Appl. No.: 280,587

[22] Filed: Dec. 6, 1988

Related U.S. Application Data

[62] Division of Ser. No. 97,183, Sep. 16, 1987.

[51] Int. Cl.⁵ ............................................. F16L 17/00
[52] U.S. Cl. ..................................... 285/355; 285/383
[58] Field of Search ............... 285/383, 355, 333, 334, 285/332.2

[56] References Cited

U.S. PATENT DOCUMENTS

| | | | |
|---|---|---|---|
| 322,845 | 7/1885 | Nugent | 285/383 X |
| 521,465 | 6/1894 | Gage | 285/383 X |
| 670,584 | 3/1901 | Fowle, Jr. | 285/383 X |
| 906,225 | 12/1908 | Harrison | 285/383 X |
| 2,051,499 | 8/1936 | Siegle | 285/333 |
| 2,374,138 | 4/1945 | Sanford | 285/383 X |
| 2,533,885 | 12/1950 | Hill | 285/383 X |
| 2,669,465 | 2/1954 | Newell | 285/383 X |
| 3,266,821 | 8/1966 | Safford | 285/383 X |
| 3,339,945 | 9/1967 | McCrory, Jr. et al. | 285/355 X |
| 3,427,050 | 2/1969 | Krieg | 285/332.2 X |
| 4,489,963 | 12/1984 | Roulins et al. | 285/334 |
| 4,679,831 | 7/1987 | Kielminski | 285/383 X |
| 4,712,815 | 12/1987 | Reeves | 285/355 X |
| 4,770,448 | 9/1988 | Strickland et al. | 285/333 |

Primary Examiner—Dave W. Arola
Assistant Examiner—Carol I. Bordas
Attorney, Agent, or Firm—Finnegan, Henderson, Farabow, Garrett & Dunner

[57] ABSTRACT

A gauging device and method for use in coupling threaded tubular articles including tubes and couplings. The device and method provides for the use of gauges for the tube and coupling that provide markings thereon that when in register during coupling indicate when a preselected threading distance has been achieved. A coupling assembly is provided that employs an annular gasket attached to the coupling and adapted to be deformed by the end of a tube when inserted into the coupling to provide sealing.

7 Claims, 7 Drawing Sheets

GAUGING DEVICE AND METHOD FOR COUPLING THREADED, TUBULAR ARTICLES AND A COUPLING ASSEMBLY

This is a continuation of application Ser. No. 097,183, filed Sept. 16, 1987.

BACKGROUND OF THE INVENTION

1. Field of the Invention

The present invention relates to a gauging device and method for coupling threaded, tubular articles including a pin and a coupling adapted for relative threaded engagement. The invention also relates to a coupling assembly that is particularly adapted for use with the gauging device and method.

2. Description of the Prior Art

In various threaded coupling applications, such as gas and oil well extraction applications, it is necessary to couple threaded, tubular articles in a manner that ensures that proper threaded engagement and coupling is achieved. If the threading engagement distance during coupling is not adequate, the coupling may be characterized by poor sealing. On the other hand if the threading engagement distance is too great, the coupling will be subject to high stress, which may result in cracking of the coupling or the tube. It is essential, therefore, in threaded coupling applications that each like coupling and tube have a proper, predetermined threading engagement distance.

Although various gauging devices are available for this purpose, they are either of complex construction and cumbersome for use in the field, or do not provide the required degree of accuracy with respect to threading engagement distance.

In these threaded coupling applications, it is advantageous to provide for sealing at the ends of threaded tubes that are joined by a threaded coupling in a manner that provides for a reliable seal between the coupled ends of the tubes while maintaining a flush, continuous surface between the coupled ends thereof.

SUMMARY OF THE INVENTION

It is accordingly a primary object of the present invention to provide a gauging device and method for coupling threaded, tubular articles, including a pin and a coupling adapted for relative threaded engagement, which provide reliable and accurate gauging and yet embody relatively simple construction and operation thus permitting easy use in the field.

An additional object of the invention is to provide a coupling assembly that provides a reliable seal, such as at the ends of two coupled tubes joined by a threaded coupling.

The gauging device of the invention is for use in coupling threaded, tubular articles including a pin and a coupling adapted for relative threaded engagement. The device has a first gauge adapted for engagement with a pin and having internal projections terminating at an internal flange with a longitudinal distance from the internal flange to a first marking location on the gauge equalling a preselected thread coupling distance of threaded engagement of the pin with a coupling. Means are provided for marking the pin at this first marking location with the end of the pin abutting the internal flange of the gauge. A second gauge is provided and is adapted for engagement with a coupling and has external projections terminating at an external flange on one end of the gauge with a longitudinal distance from the external flange to an opposite end of the gauge equalling a preselected thread coupling distance during threaded engagement of the pin and coupling. Means are provided for marking the coupling at this second marking location on the gauge with the end of the coupling abutting the external flange of the tubular gauge. In this manner, during threaded engagement of a pin and coupling, registration of markings so provided on the pin and coupling by the marking means ensures the preselected coupling distance to reduce connection stress and provide good coupling sealing.

The marking means is adapted for marking the pin or the coupling with a mark relating to a range of preselected coupling distance of the pin and coupling. In this regard, the marking means may be adapted to mark the pin or coupling with a transverse marking. The marking means may be integral with the gauge or gauges. Either one or both of the gauges in accordance with the invention may have a plurality of marking means including marking locations with the plurality of marking locations being spaced apart with the spaced apart distance being relative to the geometry of at least one of the pin or coupling. The spaced apart distance may be related to the geometry of sealing surfaces of the pin or coupling. The sealing surfaces may be the thread surfaces.

In accordance with the method of the invention, such includes positioning a first gauge having internal projections terminating at an internal flange onto a threaded portion of a pin until an end of the pin abuts the internal flange and a first marking location on the first tubular gauge equals a preselected threaded coupling distance of the threaded engagement of the pin and coupling. The pin is marked at the first marking location with the first marking relating to this preselected threaded coupling distance of the pin and coupling. A second gauge having external projections terminating at an external flange is positioned into a threaded portion of the coupling until an end of the coupling abuts the external flange and a second marking location on the second gauge equals a preselected threading coupling distance of the threaded engagement of the pin and coupling. The coupling is marked at the second marking location with a second marking related to the preselected threaded coupling distance of the pin and coupling.

Further, in accordance with the method, at least one of the pin and coupling may be provided with a marking relating to a range of preselected coupling distance. In addition, the marking relating to a range of preselected coupling distance may be a transverse marking.

In accordance with the coupling assembly of the invention, this comprises an annular coupling having internal threads adapted for threaded engagement with external threads of a pin or tube inserted into the coupling. The coupling has an annular gasket of deformable material at an interior portion thereof intermediate the ends thereof and engaging means are provided on the interior portion of the coupling for engaging the gasket to fixedly connect the same to the coupling. The engaging means may include a flange that projects from the interior portion of the coupling and into the gasket. In addition, the flange may be annular and continuous along the interior portion of the coupling. The flange may have a cross-section contoured to mate with an annular notch provided in the gasket. The engaging means may further include an annular groove on the interior portion of the coupling within which the gasket is seated.

The coupling assembly may include at least one tube in threaded engagement with the coupling with an end of the tube extending into the coupling and into engagement with the gasket to deform the gasket. Two tubes may be in threaded engagement with the coupling with ends thereof engaging opposite sides of the gasket to deform it.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE PREFERRED EMBODIMENT

Applicant's invention in accordance with one embodiment thereof employs two gauges. One gauge has internal threads and is adapted for use with a pin having external threads. A second gauge having external threads is used with a coupling having internal threads.

Figure 1:
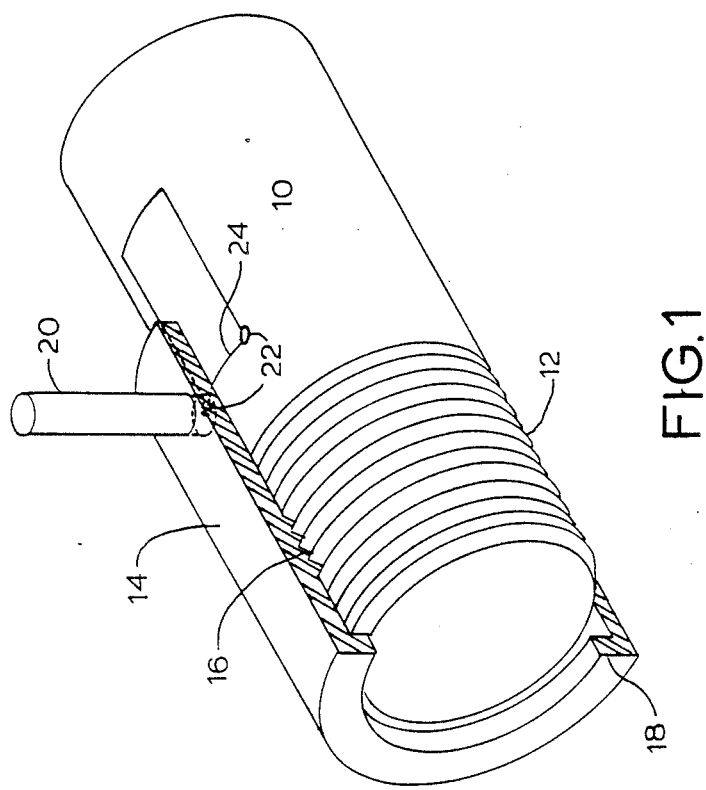
FIG. 1 is a perspective view in partial section of one embodiment of a gauge in accordance with the present invention showing the gauge threaded onto a pin.

With reference to FIG. 1, a pin 10, having external threads 12 is shown in threaded engagement with gauge 14 having internal threads 16 and an annular internal flange 18. The gauge 14 has a pair of spaced-apart integral scribes 20 which are identical and only one of which is shown in the drawing. The longitudinal distance from the flange 18 to the scribes 20 defines the preselected, thread coupling distance when the pin is in preselected, proper threaded coupling engagement with the coupling. Consequently, with the pin and gauge being in the position shown in FIG. 1 wherein the end of the coupling is in contact with the flange 18 of the gauge, by providing two markings 22 by each of the pair of scribes 20 and transverse marking 24 between the markings 22 on the pin, the position of the end of the coupling when thread onto the pin for achieving a desired, preselected thread coupling distance is established. The transverse marking 24 provides for and defines a range of suitable coupling distance.

Figure 2:
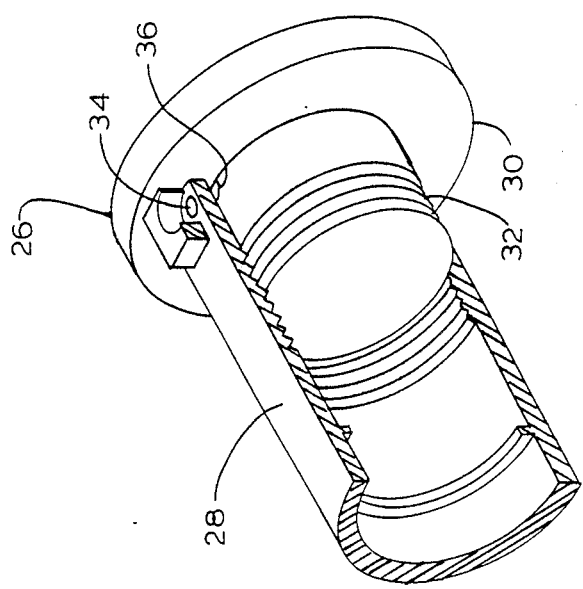
FIG. 2 is a perspective view in partial section of a gauge in accordance with one embodiment of the invention showing the gauge threaded into a coupling.

FIG. 2 shows an additional gauge 26 adapted for use with a coupling 28. The gauge 26 has an external flange 30 and external threads 32. The flange 30 has a mark 34. With the gauge 26 being in the position shown in FIG. 2 with the flange 30 engaging the end of the coupling 28, the mark 34 defines the threaded position of the coupling end relative to the marking on the pin to indicate that the preselected coupling distance has been achieved. Accordingly, the coupling end is provided with a mark 36 in register with mark 34. The mark 36 on the coupling thus establishes the relative thread coupling distance when in register with markings 22 or 24 on the pin. As with the gauge 14, a pair of marks 34 may be provided on the gauge 26 to provide a range of coupling distance.

Figure 3:
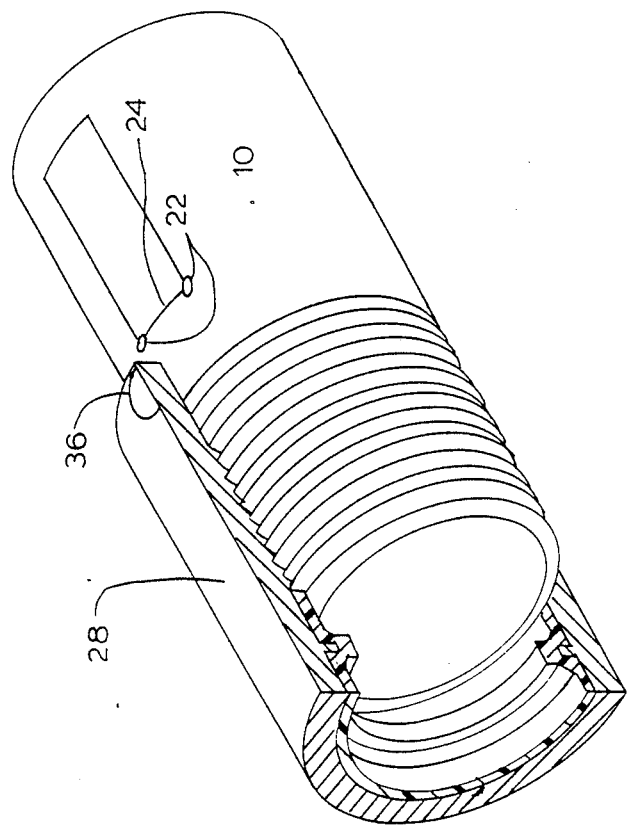
FIG. 3 is a perspective view in partial section showing the threading of a pin into a coupling in accordance with the invention, with the threading engagement being at an intermediate stage.
Figure 4:
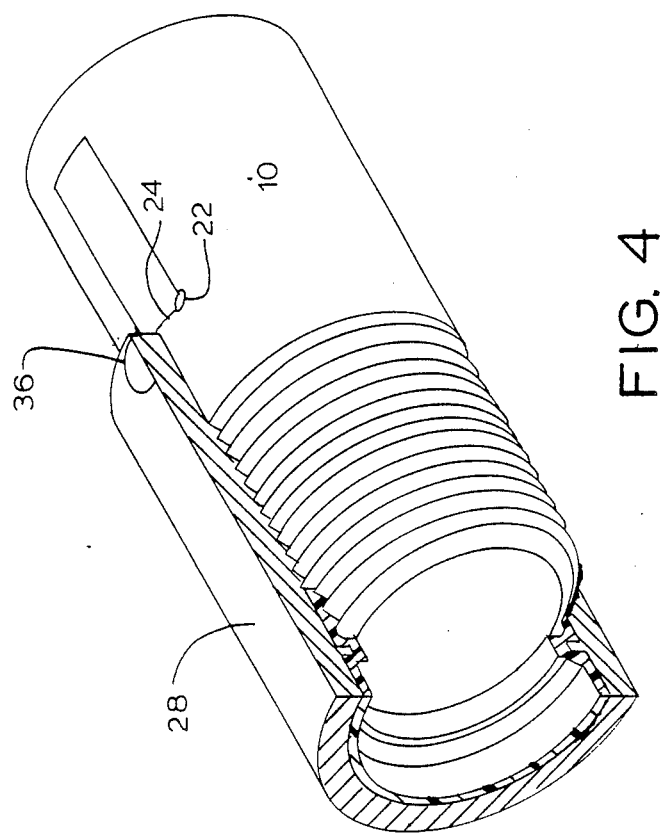
FIG. 4 is a view similar to FIG. 3 showing the pin and coupling at the final coupling position.

As shown in FIGS. 3 and 4, threading of the pin and coupling is continued until the end of the coupling 28 is in register with marking 24 and the marking 36 is at a position between markings 22 and thus along transverse marking 24. At this position, the final desired, preselected coupling distance determined by the use of gauges 14 and 26 is achieved, as shown in FIG. 4. The marking 24 on the pin defines an acceptable coupling distance range for register with marking 36 on the coupling.

It is understood that the means for marking the pin and coupling, such as the scribe 20, may be integral with each gauge, integral with only one of the gauges or a separate device used independently with each gauge.

The gauges, in accordance with the invention, may be constructed from a master set of gauges with the dimensions of the master set of gauges being empirically determined for each particular pin and coupling design and materials. As may be seen from the described embodiment of applicant's invention, the gauges are of simple construction and may be used without complex manipulation or auxillary equipment. This renders the invention desirable for use in field applications.

Figure 5:
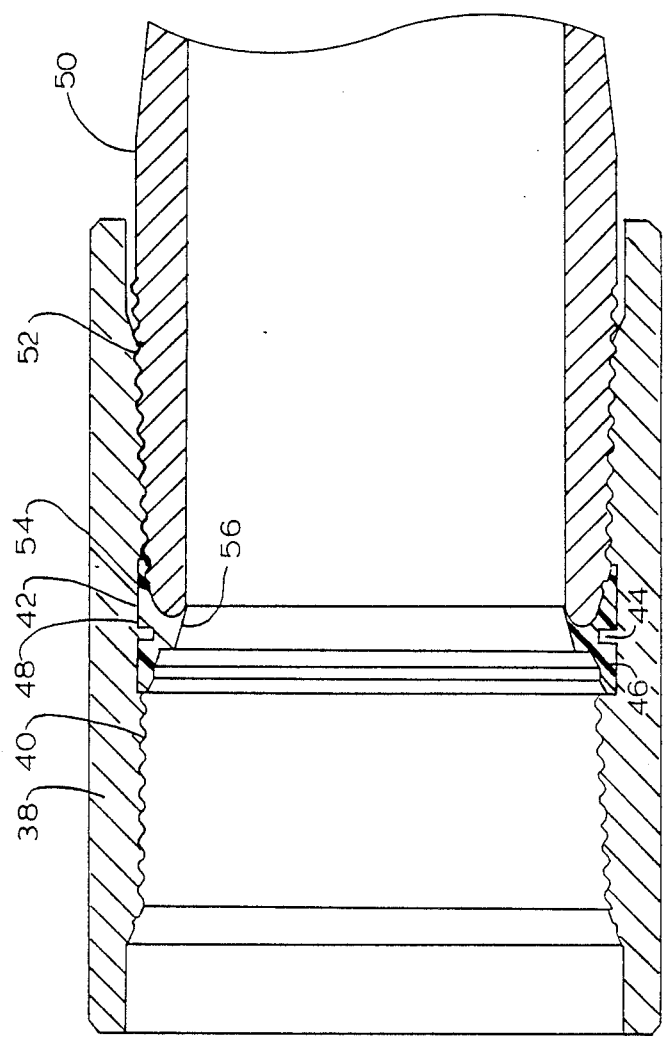
FIG. 5 is a cross-section of an embodiment of a coupling assembly in accordance with the invention.

With the coupling assembly of the invention of the embodiment shown in FIG. 5, a coupling 38 having internal threads 40 is provided with an annular notch 42 having an annular centrally disposed flange or projection 44. A deformable gasket 46 of annular construction is provided within the notch 42 and has a recess 48 into which the annular flange 44 is inserted during assembly. In this manner, the gasket is held fast within the annular notch 42. A tube 50 having external threads 52 is inserted in threaded engagement into the coupling and into contact with the gasket at an end 54 thereof. The gasket is of deformable material such as metal, rubber or plastic. Consequently, as may be seen from FIG. 5, the end 54 of the tube 50 compresses the gasket so that it is deformed to provide a surface 56 that may be substantially flush with the interior surface of the tube 50. In this manner, a continuous, smooth surface is provided at the end of the tube 50.

Figure 6:
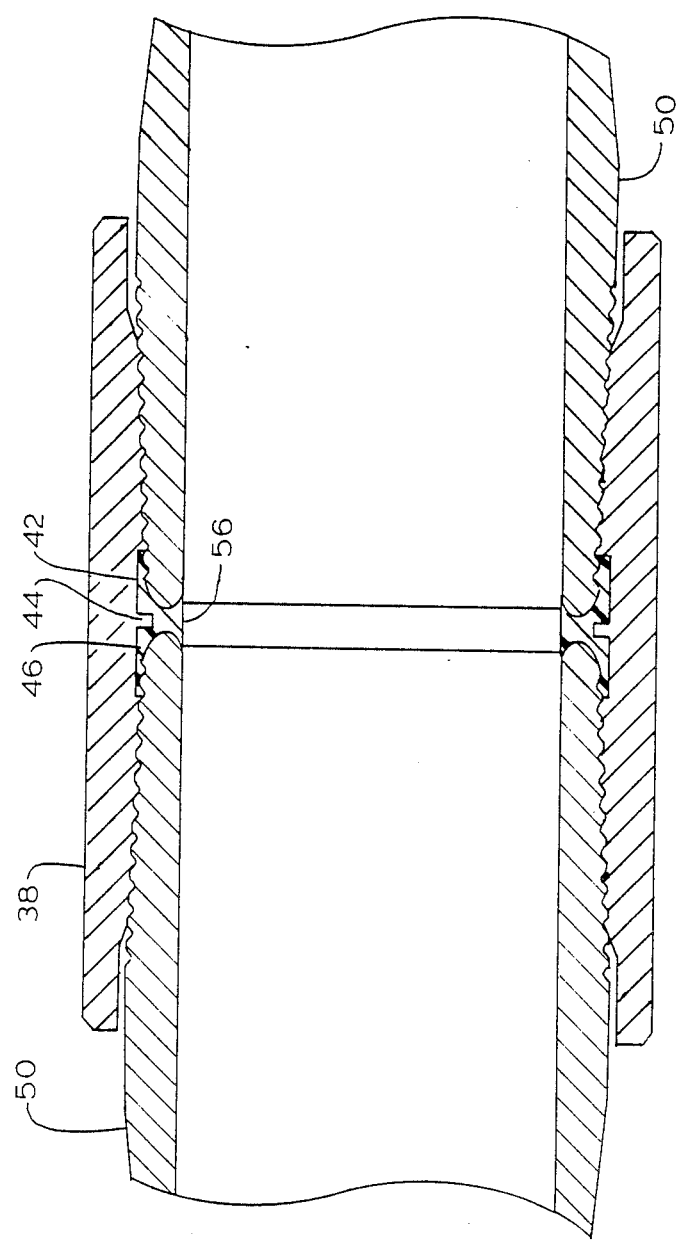
FIG. 6 is a cross-section of an additional embodiment of a coupling assembly in accordance with the invention including two tubes and an associated coupling.

As shown in FIG. 6, the coupling assembly in accordance with the invention may be provided in an embodiment coupling two identical tubes, each designated as 50. As may be seen from FIG. 6, the surface 56 of the gasket is substantially flush with the interior surfaces of the tube 50 upon completion of coupling. The gasket 46 is deformed by the ends of the tubes 50 to provide the flush connection therebetween.

Figure 7:
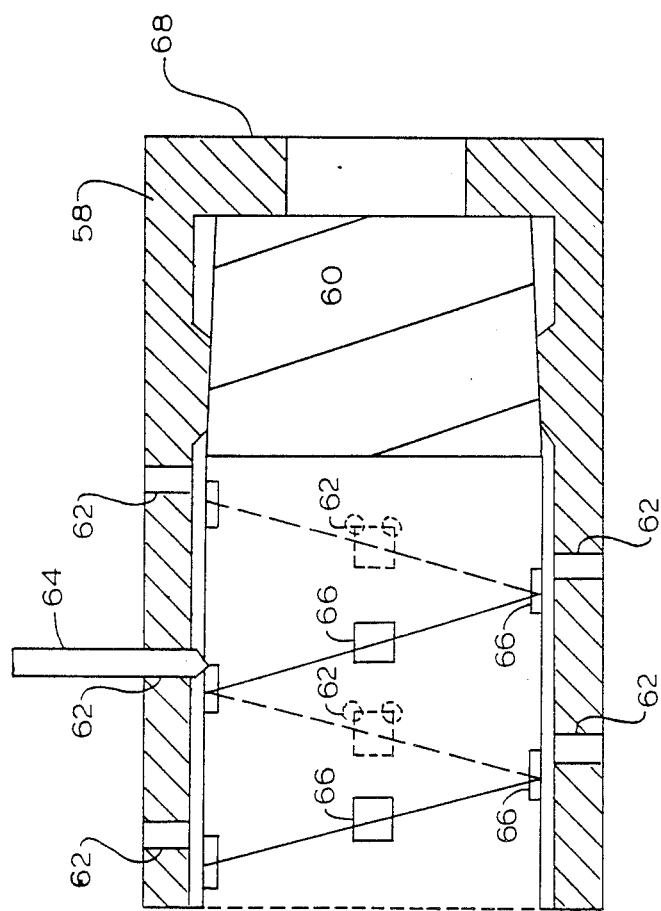
FIG. 7 is a cross-section of an alternate embodiment of the gauge of the invention shown as threaded onto a pin.

With reference to FIG. 7, there is shown a gauge 58 in threaded engagement with a pin 60. The gauge 58, with respect to the alternate embodiment of the invention shown in FIG. 7, has a plurality of marking locations 62. A scribe 64 is adapted for insertion within the annular openings in the gauge constituting the marking location 62. The annular openings constituting the marking location 62 are spaced apart in helical arrangement along the gauge 58. The distances between the marking location 62 correspond to various, different engagement distances of the pin with a coupling (not shown) during pin and coupling threaded engagement. These engagement distances are determined and governed by variations in the connection geometry between the pin and coupling. More specifically, in this regard, the engagement distances with respect to the pin and coupling increase in accordance with decreased diameter thereof relative to the nominal diameter. Conversely, the engagement distances decrease in accordance with increased diameter relative to the nominal diameter. It may be seen, therefore, from FIG. 7, that the scribe 64 may be used to provide markings 66 at each of the plurality of marking locations 62. Prior to use of the gauge 58 in accordance with the invention, the pin 60 is measured to determine the thread diameter. In this manner, it may be determined whether the thread diameter is nominal or varies to a greater or lesser degree from nominal. In accordance with this determination, upon application of the gauge 58, the specific marking location 62 may be thereby selected for marking of the pin by the scribe 64. Specifically in this regard, if the pin diameter is less than normal, a marking location further from the flange 68 of the gauge 58 would be selected for marking. With pins of diameters that approach normal or less than normal a marking location correspondingly further along the gauge 58 toward the flange 68 thereof would be selected. In this manner, marking of the pin may be achieved to compensate for variations in thread diameter from a normal diameter.

Although not shown, it is understood that a similar gauge could be used with a coupling with the internal thread diameter thereof being also determined with respect to any variation from normal. The gauge used therewith would be similar to the gauge shown in FIG. 2 except that it would have various marking locations along the periphery of the end thereof adjacent to the flange. As earlier described, upon engagement of the pin and coupling for connection thereof the marks would be brought into register to achieve the desired coupling distance.

It may be seen that this embodiment of the invention is particularly useful in applications wherein it is desired to provide for variations in the diameters of the pin and coupling.

Coupling assemblies in accordance with the above-described embodiments of the invention are particularly advantageous in applications wherein the interiors of the coupled tubes are lined with a material, such as plastic, to provide protection against destructive media passing through the coupled tubes during use. By maintaining a continuous seal at the gasket, protection of the material of the tube from the destructive media is enhanced by preventing the exposure of the material of the tubes to the destructive media at the coupled ends thereof.

What is claimed is:

1. A coupling assembly comprising an annular coupling having internal threads adapted for threaded engagement with external threads of a tube inserted into said coupling, said coupling having an annular gasket of deformable material at an interior portion of said coupling intermediate the ends thereof, said gasket having a minimum diameter prior to deformation greater than the internal diameter of the inserted tube, said gasket having a radially inwardly extended portion thereof deformed by an end of said tube inserted into said coupling and having an integral extended portion for engaging and being deformed by said external threads of said tube inserted into said coupling, and engaging means, including a continuous, annular flange having a diameter less than the minimum diameter of said internal threads that projects radially inwardly from said interior portion of said coupling and into a mating, annular notch in said radially inwardly extended portion of said gasket for engaging said gasket to fixedly connect the same to said coupling, whereby longitudinal movement of the gasket relative to the coupling is restrained.

2. The coupling assembly of claim 1 wherein said flange has a cross-section contoured to mate with said annular notch provided in said radially inwardly extended portion of said gasket.

3. The coupling assembly of claim 1 wherein said annular coupling has at least one end thereof an extended portion with an interior, annular surface covering an external surface portion of said tube inserted into said coupling, with said interior, annular surface being out-of-contact with the covered external surface portion of said tube.

4. A coupling assembly comprising an annular coupling having internal threads adapted for threaded engagement with external threads of at least one tube in threaded engagement with said coupling with an end thereof extending into said coupling, said coupling having an annular gasket of deformable material at an interior portion of said coupling intermediate the ends thereof, said gasket having a minimum diameter prior to deformation greater than the internal diameter of the tube said gasket having a radially inwardly extended portion thereof deformed by an end of said tube extending into said coupling and having an integral extended portion for engaging and being deformed by said external threads of said tube extending into said coupling, engaging means, including a continuous, annular flange having a diameter less than the minimum diameter of said internal threads that projects radially inwardly from said interior portion of said coupling and into a mating, annular notch in said radially inwardly extended portion of said gasket, for engaging said gasket to fixedly connect the same to said coupling, whereby longitudinal movement of the gasket relative to the coupling is restrained.

5. The coupling assembly of claim 4 wherein two tubes are in threaded engagement with said coupling and ends thereof engage opposite sides of said radially inwardly extended portion of said gasket to deform said gasket with said integral extended portion of said gasket engaging said external threads of said two tubes.

6. The coupling assembly of claim 4 wherein said flange has a cross-section contoured to mate with an annular notch provided in said gasket.

7. The coupling assembly of claim 4 wherein said annular coupling has at least one end thereof an extended portion with an interior, annular surface covering an external surface portion of said tube inserted into said coupling, with said interior, annular surface being out-of-contact with the covered external surface portion of said tube.

* * * * *